United States Patent
Wei

(10) Patent No.: US 10,046,551 B1
(45) Date of Patent: Aug. 14, 2018

(54) RECYCLING METHOD FOR DETACHING THE CLOTH MATERIAL FROM THE E.V.A. INSOLE RESIDUAL PRODUCT

(71) Applicant: Sian-De Wei, Taichung (TW)

(72) Inventor: Sian-De Wei, Taichung (TW)

(\*) Notice: Subject to any disclaimer, the term of this patent is extended or adjusted under 35 U.S.C. 154(b) by 0 days.

(21) Appl. No.: 15/641,357

(22) Filed: Jul. 5, 2017

(51) Int. Cl.
| | |
|---|---|
| *B32B 38/10* | (2006.01) |
| *B32B 43/00* | (2006.01) |
| *A43B 17/00* | (2006.01) |
| *A43B 17/14* | (2006.01) |
| *B29B 17/04* | (2006.01) |
| *B29K 23/00* | (2006.01) |
| *B29K 105/04* | (2006.01) |
| *B29L 31/50* | (2006.01) |

(52) U.S. Cl.
CPC ......... *B32B 43/006* (2013.01); *A43B 17/006* (2013.01); *A43B 17/14* (2013.01); *B29B 17/04* (2013.01); *B29B 2017/0468* (2013.01); *B29K 2023/083* (2013.01); *B29K 2105/04* (2013.01); *B29L 2031/507* (2013.01); *B32B 38/10* (2013.01); *B32B 2331/04* (2013.01); *B32B 2437/02* (2013.01); *Y10T 156/1153* (2015.01); *Y10T 156/1911* (2015.01)

(58) Field of Classification Search
CPC . B32B 38/10; B32B 43/006; Y10T 156/1153; Y10T 156/1911
USPC ................................................ 156/711, 752
See application file for complete search history.

(56) References Cited

U.S. PATENT DOCUMENTS

| | | | | |
|---|---|---|---|---|
| 3,025,206 | A | \* 3/1962 | Scholl | A43B 17/00 156/219 |
| 2008/0229622 | A1\* | 9/2008 | Mori | A43B 13/04 36/25 R |
| 2009/0145542 | A1\* | 6/2009 | Zoller | C09J 7/0207 156/249 |
| 2017/0368735 | A1\* | 12/2017 | Iovu | A43B 23/0235 |

\* cited by examiner

*Primary Examiner* — Mark A Osele
*Assistant Examiner* — Nickolas Harm
(74) *Attorney, Agent, or Firm* — Alan D. Kamrath; Kamrath IP Lawfirm, P.A.

(57) ABSTRACT

A recycling method includes providing an EVA insole residual product including an EVA foam material, a film, and a cloth material, placing the EVA insole residual product into an oven, heating the EVA insole residual product to a temperature of 130±25° C., and detaching the cloth material from the EVA foam material. The film includes an EVA, and a tackifier. The EVA of the film has a mass proportion of 85-95%. The tackifier has a mass proportion of 5-15%. An antioxidant is appended into the film and has a mass proportion of 0.1% of the total mass of the EVA and the tackifier. After the cloth material is detached from the EVA foam material, the EVA foam material and the film are crushed and kneaded and are recycled.

2 Claims, 4 Drawing Sheets

RECYCLING METHOD FOR DETACHING THE CLOTH MATERIAL FROM THE E.V.A. INSOLE RESIDUAL PRODUCT

BACKGROUND OF THE INVENTION

1. Field of the Invention

This invention relates to a recycling technology and, more particularly, to a recycling method for detaching the cloth material from the E.V.A. (ethylene vinyl acetate) insole residual product left over from a shoe insole manufacturing process.

2. Description of the Related Art

A conventional EVA insole residual product consists of an EVA foam material, a film coated on the EVA foam material, and a cloth material bonded onto the film. In fabrication, the film is coated on the EVA foam material, and the cloth material is bonded onto the film. Then, the EVA foam material, the film and the cloth material are heat pressed and molded into a semi-product. Then, the semi-product is cut to form many insole products and insole residual products. However, the film is sandwiched between the EVA foam material and the cloth material, so that the EVA foam material and the cloth material are combined tightly and closely to form a single material by bonding the film. It is very difficult to detach the cloth material from the EVA foam material, so that a conventional EVA insole residual product cannot be recycled or reused, and has to be thrown away, thereby wasting the material, and creating environmental pollution.

BRIEF SUMMARY OF THE INVENTION

The primary objective of this invention is to provide a recycling method that is used to detach the cloth material from the EVA insole residual product easily and conveniently.

In accordance with this invention, the EVA insole residual product consists of an EVA foam material, a film, and a cloth material. By placing the EVA insole residual product into an oven, heating the EVA insole residual product to a temperature of 130±25° C., and detaching the cloth material from the EVA foam material. The film includes an EVA, and a tackifier. The EVA of the film has a mass proportion of 85-95%. The tackifier of the film has a mass proportion of 5-15%. An antioxidant is appended into the film and has a mass proportion of 0.1% of a total mass of the EVA and the tackifier.

The recycling method further comprises crushing the EVA foam material and the film, and kneading the EVA foam material and the film.

The primary advantage of this recycling method is that after the temperature of the oven reaches the temperature of 130±25° C., and the EVA foam material is subjected to such a temperature variation, only the physical features of the EVA foam material are changed. The chemical features of the EVA foam material remain unchanged, so that the EVA foam material can be recycled and reused after the kneading procedure.

Further benefits and advantages of this invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
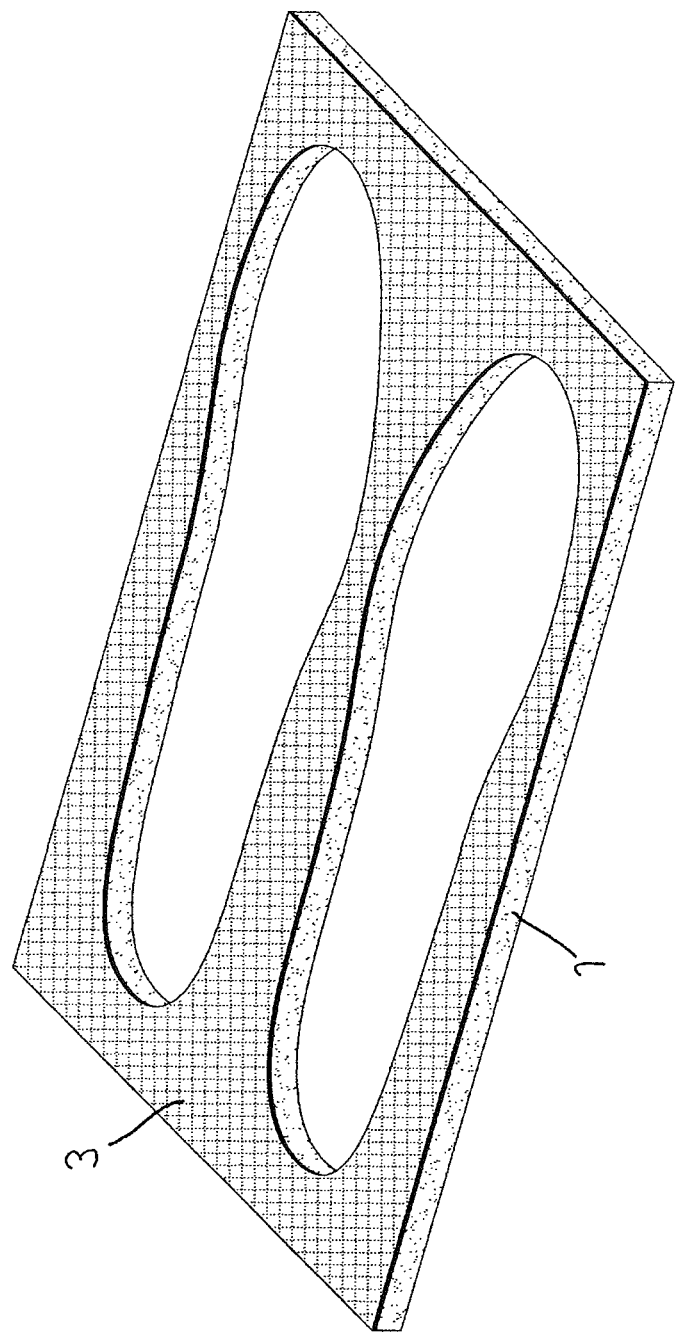
FIG. 1 is a perspective view of an EVA insole residual product in accordance with the preferred embodiment of this invention.
Figure 2:
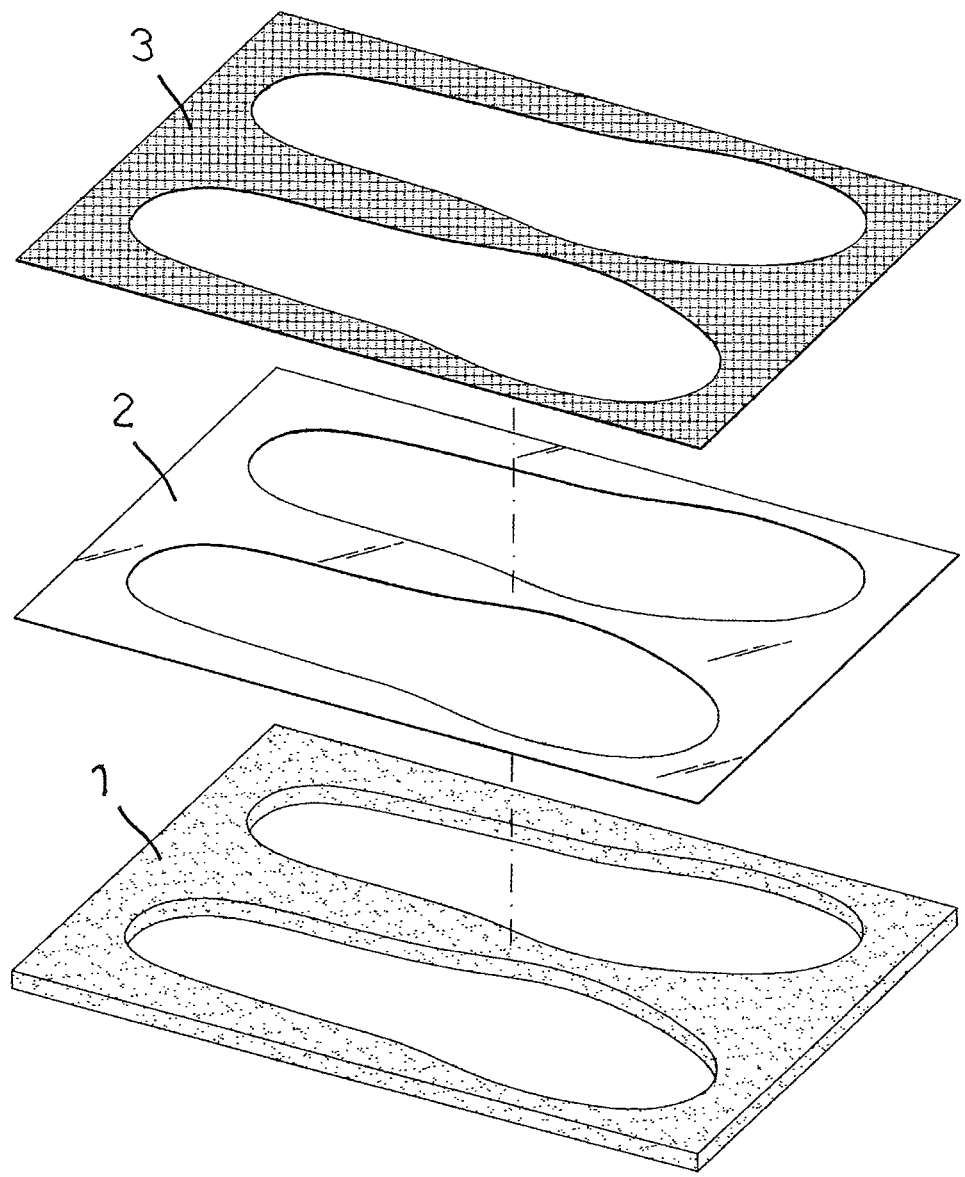
FIG. 2 is an exploded perspective view of the EVA insole residual product as shown in FIG. 1.

Referring to the drawings and initially to FIGS. 1 and 2, an E.V.A. (ethylene vinyl acetate) insole residual product in accordance with the preferred embodiment of this invention comprises an EVA foam material 1, a film 2 coated on the EVA foam material 1, and a cloth material 3 bonded onto the film 2.

The EVA foam material 1 has a melting point of 80-100° C., and has a decomposition point of 200° C. The EVA foam material 1 is heated and melted into a liquid with a determined viscosity.

The film 2 is preferably a JD (Jiunn Dean) film which is manufactured by the Jiunn Dean company. The film 2 includes an EVA, and a tackifier. The EVA of the film 2 has a mass proportion of 85-95%. The tackifier of the film 2 has a mass proportion of 5-15%. An antioxidant is appended into the film and has a mass proportion of 0.1% of a total mass of the EVA and the tackifier. For example, when the total mass of the EVA and the tackifier is 100 g (one hundred grams), the mass of the antioxidant is 0.1 g.

In fabrication, the film 2 is coated on the EVA foam material 1, and the cloth material 3 is bonded onto the film 2. Then, the EVA foam material 1, the film 2 and the cloth material 3 are heat pressed and molded into a semi-product. Then, the semi-product is cut to form many insole products and insole residual products.

Figure 3:
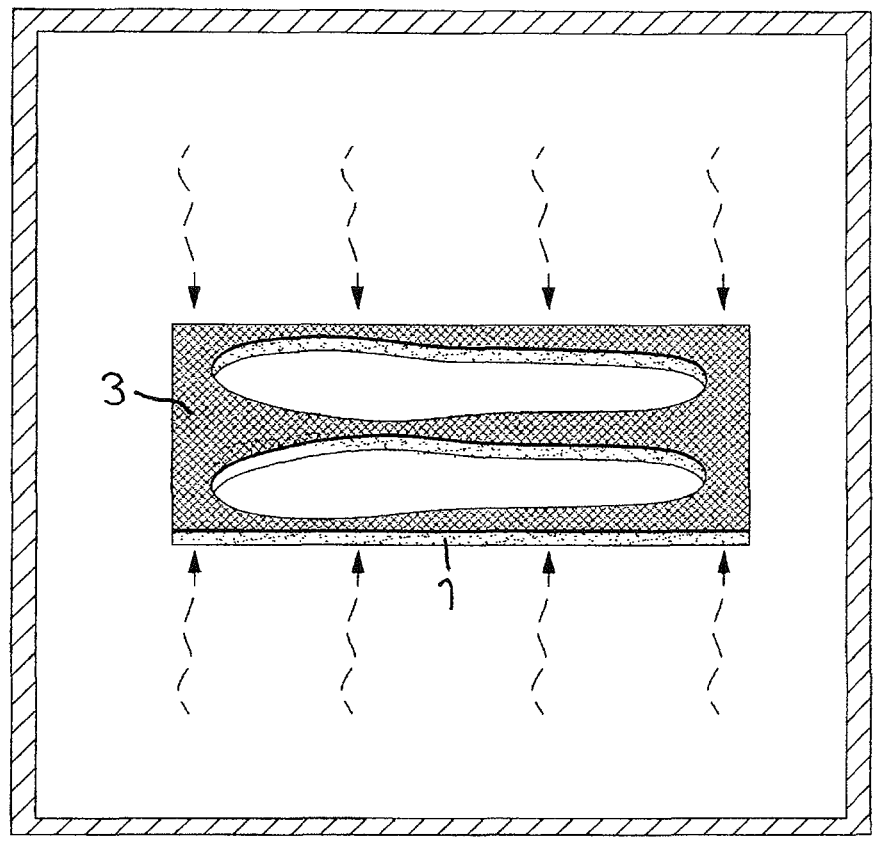
FIG. 3 is a cross-sectional view showing that the EVA insole residual product is placed into an oven.
Figure 4:
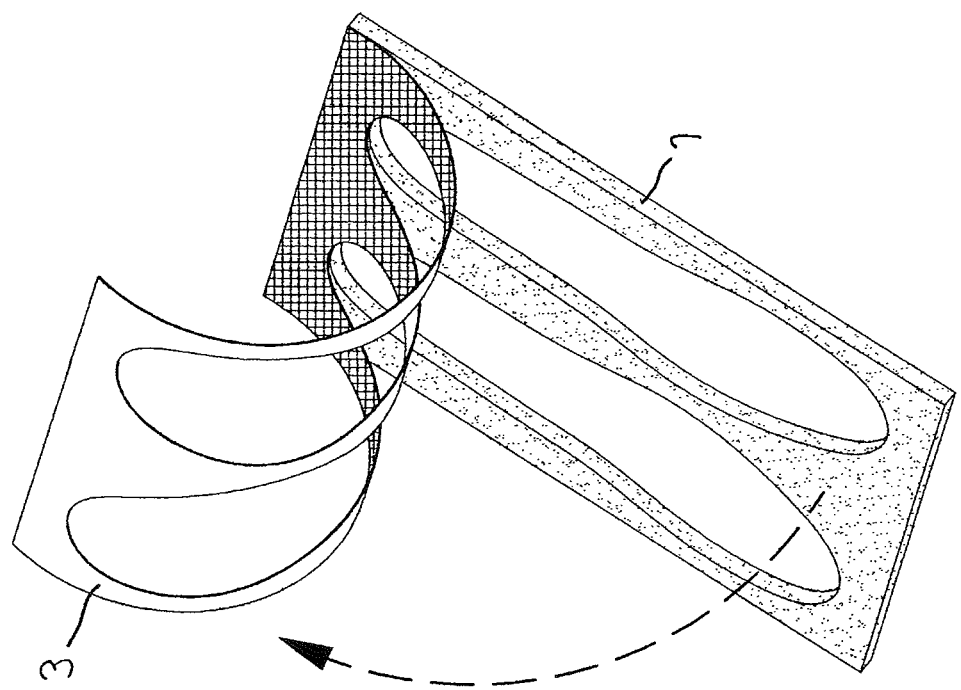
FIG. 4 is a perspective view showing that the cloth material is detached from the EVA insole residual product.

Referring to FIGS. 3 and 4 with reference to FIGS. 1 and 2, a recycling method for detaching the cloth material from the EVA insole residual product comprises providing an EVA insole residual product including an EVA foam material 1, a film 2, and a cloth material 3, placing the EVA insole residual product into an oven, heating the EVA insole residual product to a temperature of 130±25° C. as shown in FIG. 3, and detaching the cloth material 3 from the EVA foam material 1 as shown in FIG. 4.

In practice, the EVA insole residual product is initially placed into the oven to be heated. When the temperature of the oven reaches the temperature of 130±25° C., the cloth material 3 is detached easily from the EVA foam material 1. At this time, the EVA foam material 1 has a melting point of 80-100° C., and has a decomposition point of 200° C. Thus, after the EVA foam material 1 is subjected to the temperature variation of 130±25° C., only the physical features of the EVA foam material 1 are changed, while the chemical features of the EVA foam material 1 are unchanged.

It is important that, the formula of the film 2 is different from that of the conventional film. The film 2 includes an EVA with the proportion of 85-95%, a tackifier with the proportion of 5-15%, and an antioxidant with a proportion of 0.1% of the total amount of the EVA and the tackifier. Thus, by the special formula of the film 2, when the temperature of the oven reaches the temperature of 130±25° C., the cloth material 3 is detached easily from the EVA foam material 1. The above results are obtained according to practical experiments.

As shown in FIG. 4, the primary component of the film 2 is the EVA with the proportion of 85-95%, so that when the temperature of the oven reaches the temperature of 130±25° C., the film 2 is melted and is combined integrally with the EVA foam material 1. Thus, the film 2 is not seen in FIG. 4. In addition, the EVA of the film 2 is the same as the EVA foam material 1 and has a melting point of 80-100° C., and has a decomposing point of 200° C., so that when the temperature of the oven reaches the temperature of 130±25° C., the film 2 is melted only and will not be detached from the EVA foam material 1.

The recycling method further comprises crushing the EVA foam material 1 and the film 2, and kneading the EVA foam material 1 and the film 2. Thus, after the EVA foam material 1 and the film 2 are crushed and kneaded, the EVA foam material 1 and the film 2 are used as a staple for making the EVA insole product.

Accordingly, after the temperature of the oven reaches the temperature of 130±25° C., and the EVA foam material 1 is subjected to such a temperature variation, only the physical features of the EVA foam material 1 are changed, while the chemical features of the EVA foam material 1 are unchanged, so that the EVA foam material 1 can be recycled and reused after the kneading procedure.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A recycling method comprising:
providing an EVA insole residual product including an EVA foam material, a film, and a cloth material;
placing the EVA insole residual product into an oven;
heating the EVA insole residual product to a temperature of 130±25° C.; and
detaching the cloth material from the EVA foam material;
wherein:
the film includes an EVA, and a tackifier;
the EVA of the film has a mass proportion of 85-95%;
the tackifier of the film has a mass proportion of 5-15%; and
an antioxidant is appended into the film and has a mass proportion of 0.1% of a total mass of the EVA and the tackifier.

2. The recycling method of claim 1, further comprising:
crushing the EVA foam material and the film; and
kneading the EVA foam material and the film.

* * * * *